July 15, 1958  P. B. VAN DOREN  2,843,400
HANDLE OF SUCTION CLEANERS OR POLISHERS
Filed Sept. 13, 1954  2 Sheets-Sheet 1
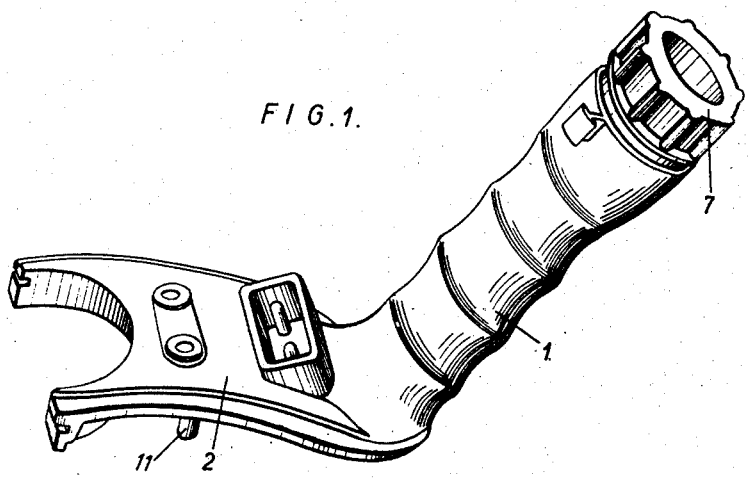
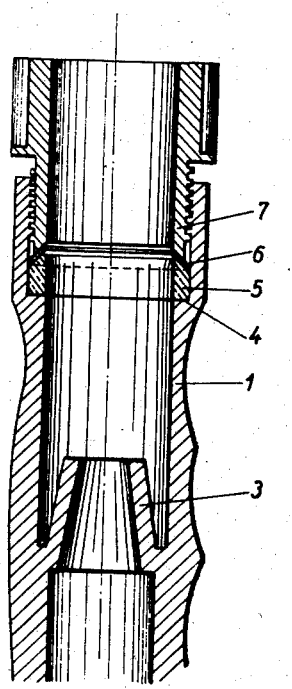
Inventor
Pierre Barthelemy VanDoren
By Michael S. Striker July 15, 1958   P. B. VAN DOREN   2,843,400
HANDLE OF SUCTION CLEANERS OR POLISHERS
Filed Sept. 13, 1954   2 Sheets-Sheet 2

Inventor
Pierre Barthelemy Van Doren
By Michael S. Striker

United States Patent Office 2,843,400
Patented July 15, 1958

2,843,400

HANDLE OF SUCTION CLEANERS OR POLISHERS

Pierre Barthelemy Van Doren, Brussels, Belgium, assignor to Le Super, Brussels, Belgium, a Belgian company Application September 13, 1954, Serial No. 455,624

Claims priority, application Belgium July 22, 1954

1 Claim. (Cl. 285—7)

The present invention relates to a handle of a particular type, designed to be provided on suction cleaners or polishers and arranged to receive an extension tube.

According to the invention, such a handle comprises internally a bearing surface of suitable shape for the end of the said tube, and at a chosen distance from this bearing surface, an elastic means which is tightened, by compression, against the said tube under the action of a device controlling the compression, the tube thus being rendered fast with the handle.

The aforesaid bearing surface will normally be in the form of a truncated cone, the end of the tube being fitted on and externally of the said bearing surface. The said bearing surface may also be in the form of an inverted truncated cone, the end of the tube then fitting internally of the said bearing surface. Finally, this bearing surface may even be formed by the combination of an inverted truncated cone, and a second truncated cone which is not inverted and which is inside the former, the end of the tube being fitted in the double conical recess thus formed.

In one particular form of construction, the resilient means is in the form of a ring located on a shoulder provided internally of the handle and adapted to surround the extension tube.

According to one particular construction, the device for controlling the compression of the elastic means and the tightening thereof against the aforesaid tube is formed by a plug fitting partially inside the handle, for example, by screwing, and adapted to compress the elastic means against its shoulder or base.

A metal conical washer will normally be interposed between the elastic means and the aforesaid plug, the latter having a conical base corresponding to the conicity of the conical washer, so that the said plug may thus, by means of the said washer, force the elastic means to be applied firmly against the extension tube.

Finally, the said plug will be formed internally with a bore for the passage of the aforesaid tube, the said bore being calibrated in a manner to correspond as near as possible to the external diameter of the tube, so that the said plug bore constitutes a supplementary bearing point for this tube.

Other details and features of the invention will be apparent from the description given hereafter by way of non-limitative example, and by reference to the accompanying drawings.

Figure 1 is a perspective view of a handle according to the invention.

Figure 2 is a view of a part of this handle in elevation and section.

Figure 4:
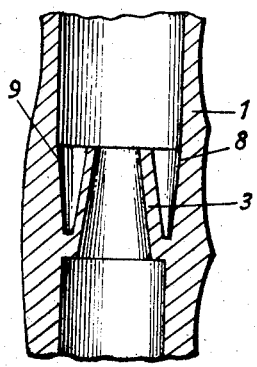
Figure 3:
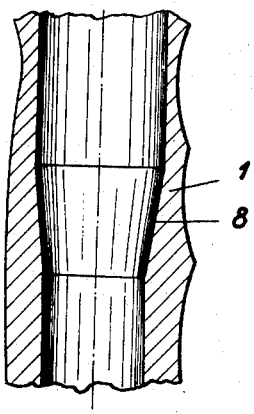

The Figures 3 and 4 are similar to the Figure 2 but relating to other embodiments.

Figure 5:
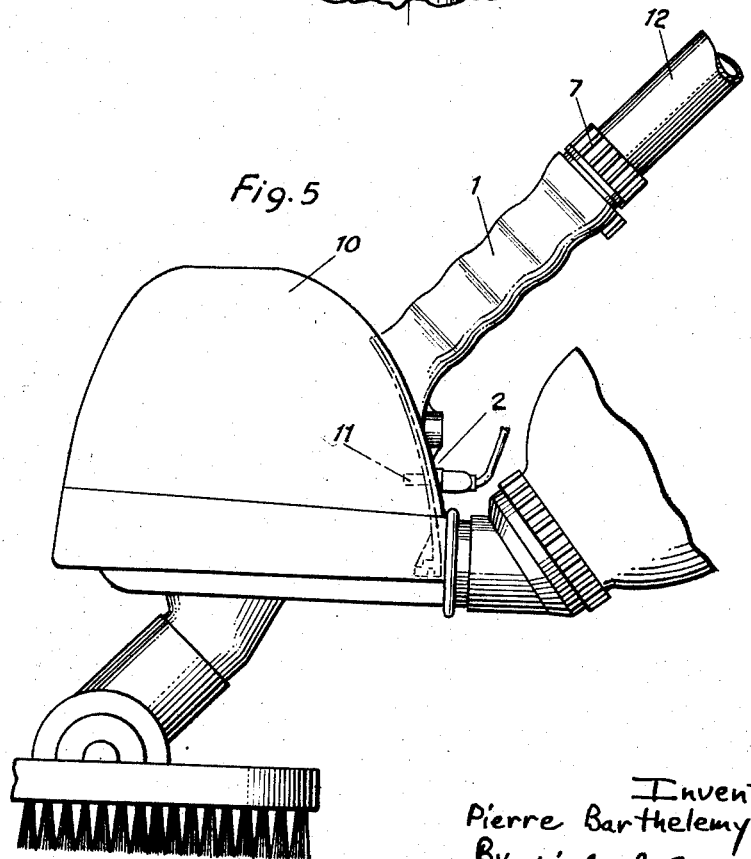

Figure 5 is a perspective view of the apparatus according to the present invention attached to a vacuum cleaner.

The handle 1 is fixed by an extension 2 to the suction cleaner 10 as shown in Fig. 5. The said extension 2 may comprise the required connection terminals 11, as shown in Figures 1 and 5. The handle 1 is formed internally with a frustoconical bearing surface 3 (Figure 2), on which is adapted to be fitted the end of the extension tube 12 as shown in Fig. 5.

The internal wall of the handle 1 can be shaped as an inverted truncated cone 8 (Figure 3), into which is fitted the end of the extension tube, said end having a corresponding shape.

As indicated on Figure 4, it is also possible to combine (Figure 4) the truncated cone 3 with the inverted truncated cone 8, the end of the extension tube being fitted into the double conical recess 9 thus formed.

Provided at a certain distance from the bearing surface 3 is a shoulder 4 on which is situated an elastic ring 5. Fitted on to the latter is a conical metal washer 6 against which a plug 7 is adapted to operate. The base of the latter is conical to correspond to the conicity of the conical washer 6. When this plug 7 is screwed into the handle 1, it acts at its bottom end on the ring 5 by means of the washer 6. The ring 5 is thus compressed and is tightened around the tube introduced into the handle, thus ensuring a very efficient connection of this tube and the said handle. The plug 7 is calibrated internally in order to correspond to the external diameter of the tube. This internal bore of the plug thus forms a supporting point and a supplementary guiding point. The frustoconical bearing surface 3 may form a detachable element or be in one piece with the handle.

In the three embodiments shown in Figures 2, 3 and 4, the shape and the dimensions of the bearing surface are so determined, that the portion of the extension tube which is intended to be inserted in the handle 1 and the plug 7 has an external diameter at the most equal to the internal diameter of the ring 5, the washer 6 and the plug 7. Thus, the extension tube may be inserted or disengaged without removal of the ring, the washer and the plug, provided that the ring 5 be released by unscrewing of the plug 7.

Summarising, the extension tube will be guided by the frustoconical surface 3 and the internal bore of the plug 7. Moreover, the said tube will be rendered fast with the handle owing to the compression of the elastic ring 5.

It is to be understood that the invention is not limited to the details given above, but that modifications may be incorporated without departing from the scope of the present invention.

I claim:

In a detachable coupling for a hollow handle, the combination of a bearing surface provided internally in said handle, said bearing surface being formed by the combination of an inverted truncated cone and of a second truncated cone which is not inverted and which is inside the former, said bearing surface thus forming a double conical recess and said recess corresponding to the shape of the end of an extension tube in which the handle is to be fitted; a shoulder provided internally in said handle at a chosen distance from said bearing surface; a resilient securing ring located on said shoulder; and a plug fitting partially in said handle and screwed in said handle in order to compress said resilient securing ring, the internal diameter of said ring, when not compressed, and of said plug being slightly larger than the external diameter of the part of said tube which cooperates with said ring and plug when the tube is inserted in said handle for the coupling, the shape and the dimensions of the bearing surface and of the corresponding end of the tube being so determined that the external diameter of the portion of said tube comprised between said part and the end thereof is at the most equal to the internal diameter of said ring and said plug.

References Cited in the file of this patent

UNITED STATES PATENTS

| | | |
|---|---|---|
| 546,314 | Farrey | Sept. 17, 1895 |
| 2,457,908 | Meyerhoefer | Jan. 4, 1949 |

FOREIGN PATENTS

| | | |
|---|---|---|
| 195,952 | Great Britain | Oct. 18, 1923 |
| 71,641 | Sweden | Apr. 21, 1931 |